United States Patent Office 3,503,219
Patented Mar. 31, 1970

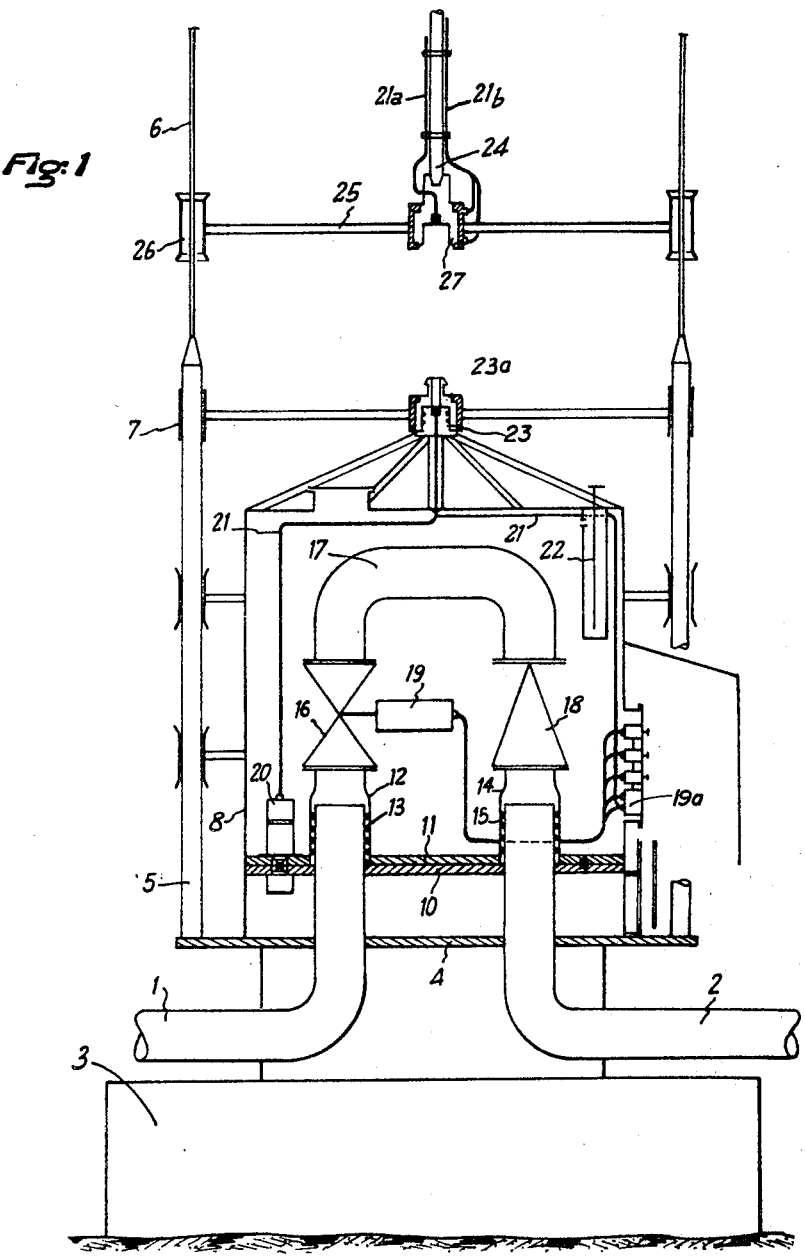

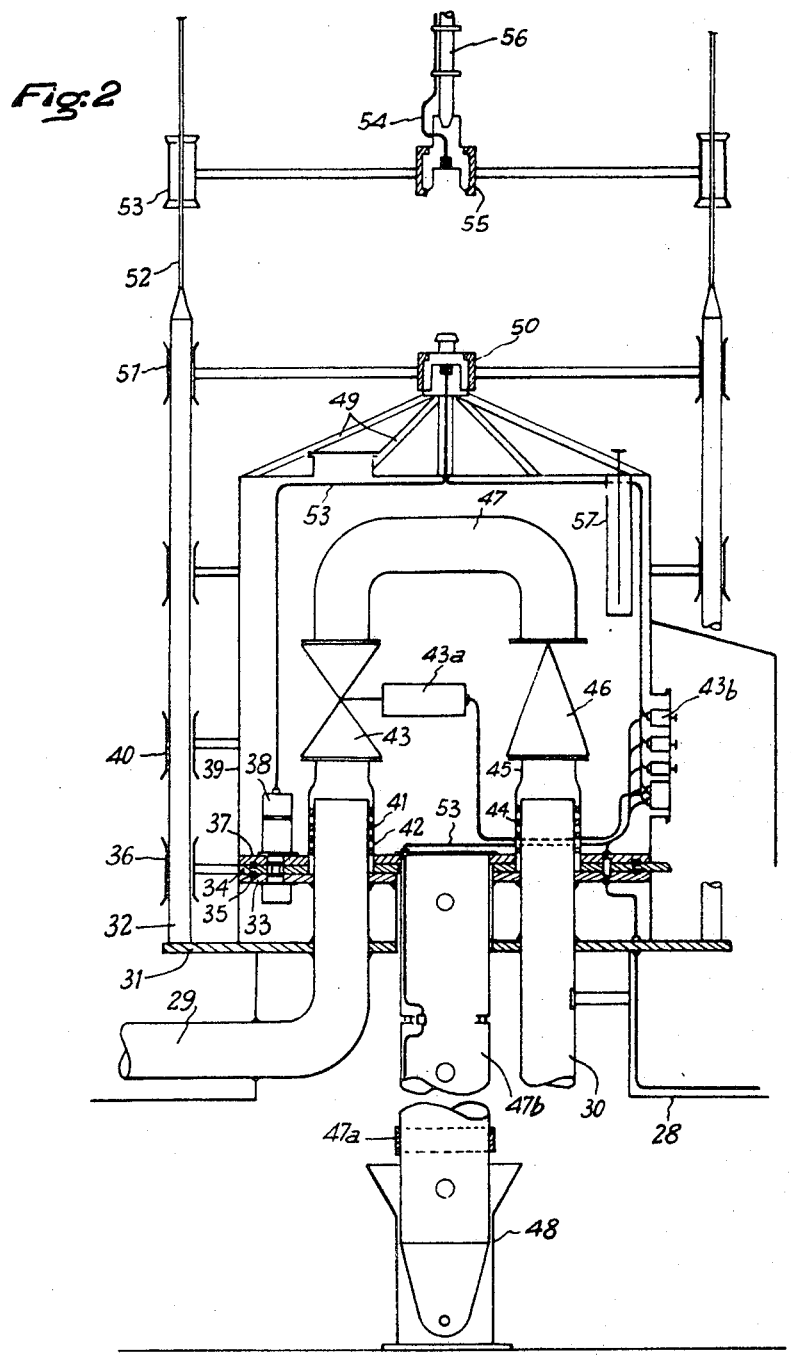

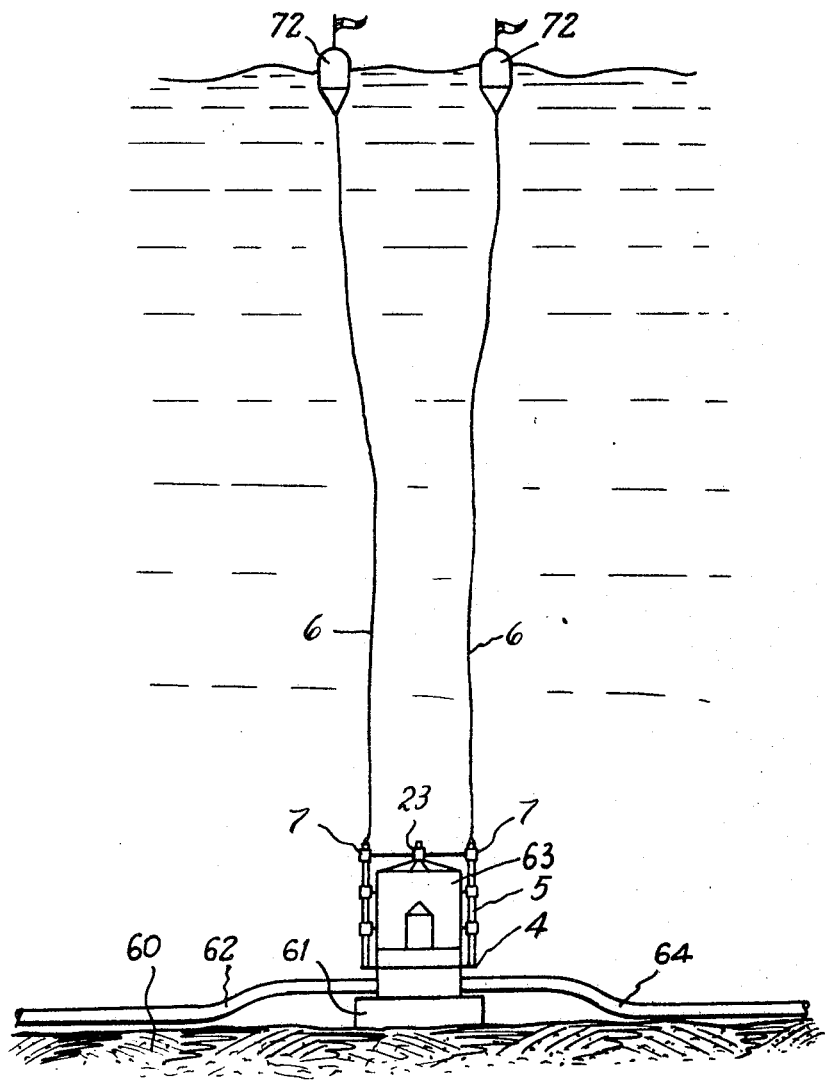

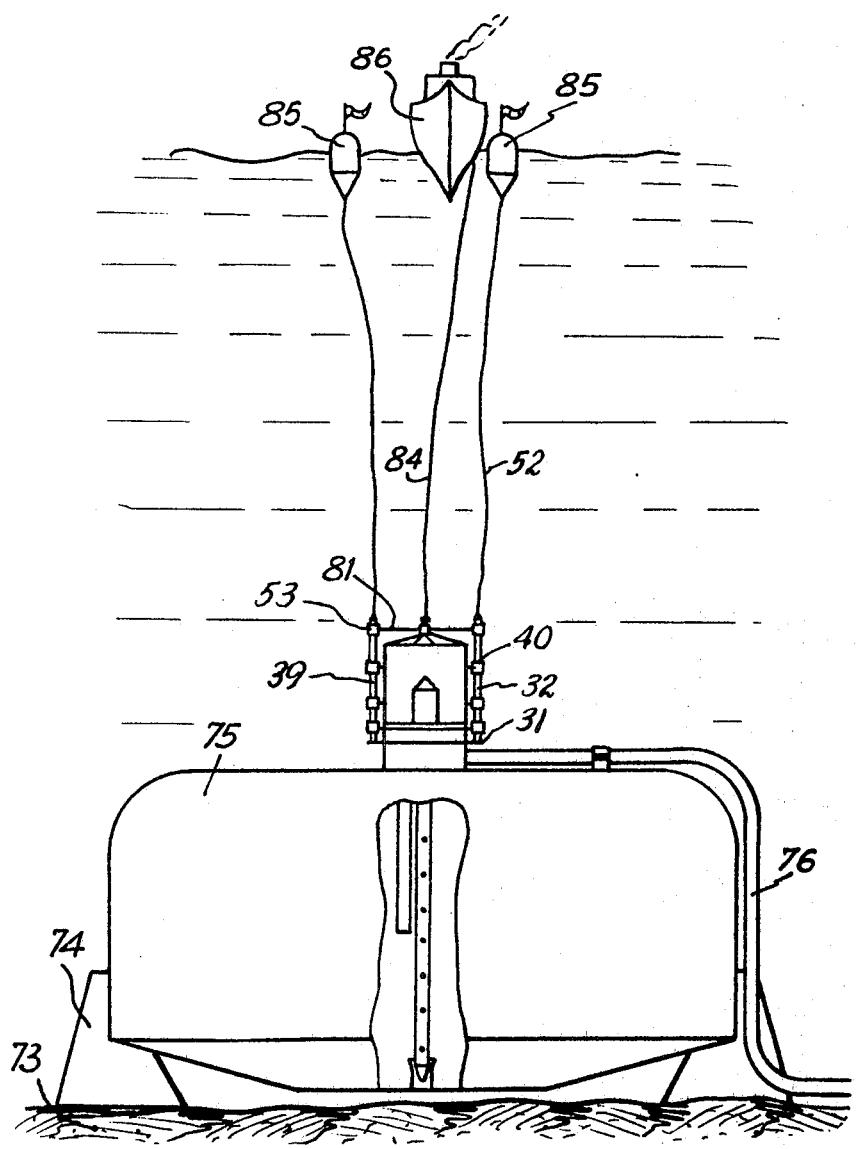

3,503,219
CONNECTION FOR SUBMERGED PIPELINES OR RESERVOIRS
Jean-Jacques Houot, Maisons-Laffitte, France, assignor to Etablissement Public a Caractere Industriel et Commercial dit: Entreprise de Recherches et d'Activites Petrolieres, Paris, France, a corporation of France
Filed Mar. 1, 1968, Ser. No. 710,449
Claims priority, application France, Mar. 3, 1967, 97,270
Int. Cl. F16l 35/00
U.S. Cl. 61—72.3                5 Claims

ABSTRACT OF THE DISCLOSURE

Connection for submerged pipelines, comprising a closed chamber inside which there are fixed connecting elements placed on the machined ends of the connected pipelines.

BACKGROUND OF THE INVENTION

The present invention relates to a pipeline connection, particularly for submerged pipelines.

The connection of pipelines by elements generally called "dividers" is known. These elements must be inspected periodically. This entails no difficulty when the lines are on the ground or in enclosures that are of easy access. However, when they are placed in difficult locations, especially when they are submerged, inspection is made well nigh impossible and their disassembly is very complicated.

The placement of these elements when they are submerged requires use of submarine divers whose task becomes more and more difficult as the depth increases.

The device of the invention is intended to alleviate these difficulties by use of a connection that can be manipulated at a distance. Moreover, the invention allows isolation of the connecting elements by interposition of a noncorrosive liquid between the said connecting elements and the surrounding medium.

The device of the present invention comprises in combination, a closed chamber comprising at least on one of its faces a relatively thick plate on which the connecting elements are fixed, the said connecting elements, an assembly of lines to be connected whose terminal portions, prior to being set in place, have been suitably machined, a guide structure that allows accurate orientation of the said closed chamber, and means for bolting the chamber and elements associated therewith onto a fixed plate that is rigidly connected to the pipeline sections.

The device additionally comprises a tool for manipulation of the closed chamber and elements associated therewith, said tool preferably being hydraulically controlled.

In one embodiment of the device of the invention, the connecting elements comprise members that ensure the seal between the various pipeline sections and the elements that are generally called "dividers."

The device of the present invention allows connection of line sections as well as connection between a reservoir and intake and discharge lines associated therewith.

The enclosure that constitutes an element of the device is preferably made of corrosion resistant metallic material. This chamber can also be filled with a noncorrosive liquid such as mineral oil, for example. The chamber can also be furnished with a valve that permits balancing of pressure between the interior of the chamber and the surrounding medium when the device is lowered at sea.

The device of the invention also comprises bolting means which allow rigid joining of the device with fixed mechanical pieces that are rigidly connected to the pipeline sections.

The invention will be more clearly understood through the following description of two embodiments, the description being illustrated by the attached figures.

FIG. 1 is an elevational view, partially in section, showing an embodiment of the device of the invention that allows connection of two pipeline sections.

FIG. 2 is an elevational view, partially in section, showing an embodiment of the device of the invention that establishes connection between a reservoir and intake and discharge lines.

FIG. 3 is an elevational view showing the placing of the device of the invention in the case of submerged pipelines.

FIG. 4 is an elevational view showing the placing of the device of the invention on a submerged reservoir.

In FIG. 1 there is shown: at 1 a pipeline section whose terminal portion has been accurately machined; at 2 a second line section whose terminal portion has been similarly machined.

These pipeline sections have been rigidly connected to an anchor block 3 which supports a plate 4 that is relatively rigid. Said plate 4 supports a guide structure 5 constituted, for example, by pipes of adequate section, said pipes being connected to cables 6 which are supported at the water surface by floating buoys.

Pipeline sections 1 and 2 are rigidly connected to a plate 10 that holds them apart in a well defined position.

Enclosure 8 which is seen in section is cylindrical in the present case. It comprises a sheet metal tank on which there is fixed a plate 11 of suitable thickness. Said plate presents a hole, and in the said hole receptacle 12 is connected, the interior of the receptacle having been accurately machined, with grooves in which sealing elements 13 are seated.

The said receptacle 12, rigidly connected to plate 11, caps the terminal portion of pipeline section 1. Similarly, a pipe section 14, machined like the former section and likewise presenting sealing elements 15, caps the terminal portion of line section 2.

On receptacle 12 there is fixed a valve 16 which is rigidly connected by its other flange to a double bend pipe 17 that is connected at its other end to a check valve 18, rigidly connected to receptacle 14 that caps line section 2.

The device likewise comprises guides 7 which are slidable on structure 5, allowing accurate orientation of the device.

The device of the invention additionally comprises bolting means such as 20 which can be, for example, a rotary bolt whose control is effected by a fluid injected from the surface via line 21.

Valve 16 is controlled by a hydraulic device 19 pressurized by lines such as 21. These lines can run along pipelines 1 and 2 and thus always be in place. There is then available at the input of the switching assembly 19a a hydraulic pressure that allows control of various elements that are not illustrated. The said pressure is applied from a generator that is under water, on a fixed structure or even ashore.

In case of rupture of a permanent pipeline, the various elements can be manipulated, with prior connection of the manipulating tool as will be described below.

Line 21 ends at a check valve in cap 23, which allows manipulation of the enclosure and the elements associated with it as a unit. The said cap 23 is connected by ties to enclose 8 and is of such configuration that it allows manipulation of the assembly by means of a tool that is now to be described.

The manipulating tool comprises substantially a hydraulically controlled connection that tops cap 23. This connection comprises a mechanical piece 27 which is centered by ties such as 25 that are connected to guides such as 26, which guides slide freely along cable 6, and then along structure 7. The manipulating tool is supported by a cable 24 on which lines 21a and 21b are fixed, which allow control of the retractable jaws borne by piece 27 and the fluid supply of line 21 by pressure applied from the surface through the said lines. Moreover, an airlock 22 is placed at the upper part of the enclosure and allows balancing of the pressure between the surrounding medium and the inside of enclosure 8.

The device also comprises an inert cap 23a that tops cap 23 when the device is in place: cap 23a is fished out before the device is pulled up by a simple tool that is not illustrated.

FIG. 2 shows a device of the invention connected to a submerged reservoir.

There is shown: at 28 the upper part of the reservoir on which there is disposed a plate 31. Said plate is rigidly connected to two pipeline sections 29 and 30. In the present case, 29 is the discharge line of the reservoir and 30 is the injection line thereof.

The terminal portions of pipeline section 29 and 30 are machined as indicated in the first example.

On plate 31 there is a tubular structure 32 which allows orientation of the device of the invention. On said plate 31 there is likewise a plate 33 rigidly connected to line sections 29 and 30.

An intermediate plate 34 bears on plate 33, said intermediate plate being rigidly connected to guides 36 that are slidable on structure 32. The said plate is free, and its role will become apparent in the description of the placement of this embodiment. In the said plate there are seated two packings 35 on either side of the said plate and rather close to its periphery. On the said intermediate plate 34 there is applied a plate 37 that is rigidly connected to enclosure 39. The joining of the enclosure and plate 33 that is rigidly connected to the reservoir is effected by a bolt 38, actuated preferably by hydraulic means. Enclosure 39 is rigidly connected to guides 40 that slide freely on structure 32. The terminal portions of pipeline sections 29 and 30 are capped respectively by receptacles 42 and 45 that are rigidly connected to base plate 37. In the said receptacles there are grooves in which sealing elements 41 and 44 are seated. On receptacle 42 there is a valve 43, whereas on receptacle 45 there is a check valve 46. Valves 46 and 43 are connected by a junction element 47.

As in the preceding example, an airlock 57 allows balancing of pressure between the surrounding medium and the inside of the enclosure, which is filled with a noncorrosive fluid.

Enclosure 39 is supported by ties 49 joined to piece 50 which in turn is rigidly connected to guides 51.

Structure 32 is connected to cables 52 which are supported at the ocean surface by floating buoys. On said cables guides 53 slide freely, said guides allowing the centering of a piece 55 which like piece 27 of the previous example ensures the setting in place and the withdrawal of the device of the invention. Said piece 55 is rigidly connected to a rod 56 that is actuated from the surface.

Fluid lines 54 allow supply to bolts 38 and the control of valve 43a, a connecting block 43b allowing hydraulic supply of various devices that are not illustrated. In addition to the above assembly, the device comprises a hollow perforated cylindrical tube 47b, the said tube being long enough to approach the bottom of the reservoir.

Tube 47b supports an electric line connected to different contacts on the said perforated tube. The contacts allow logging of the interface of stored oil and water on the one hand, and of oil and the gaseous phase on the other.

Upon descent, tube 47b is guided by movable plate 34 and supported by a ring 47a, rigidly connected to hollow cylindrical tube 47b. When plate 34 comes into contact with plate 33 it halts, being applied to said plate 33, whereas the device assembly continues its descent until the lower end of tube 47b arrives at a seat 48 provided for it.

FIG. 3 shows the placing of the device of the invention.

At 60 there is shown the ocean floor on which a base 61 has been established. On said base there are anchored two pipeline sections 62 and 64 which are rigidly connected to plate 4 which in turn supports structure 5.

On said structure 5 the assembly of the device described in FIG. 1 is placed, being oriented by guides 7. In the drawing the protective cap is in place.

FIG. 4 shows a device of the invention placed above a submerged reservoir. On the ocean floor 73 there is placed an anchoring device 74 on which a submerged reservoir 75 rests. A pipeline 29 ends in the reservoir. Said pipeline is rigidly connected to a platform 31 that supports a structure 32.

Guides 40 slide freely on said structure. Said guides are rigidly connected to enclosure 39 of the invention. Said device is manipulated by tool 81 with guides 53 which slide along cables 52 and then along the tubes of structure 32.

A cable 84 ensures manipulation of tool 81 which allows the placement and the removal of enclosure 39. Cables 52 are connected to floating buoys and the manipulation of tool 81 by means of cable 84 is effected from vessel 86.

At the moment of manipulation, cables 52 are pulled up and tensioned from the boat, to facilitate guiding of the device.

The operation of the device of FIG. 1 is as follows.

At the ocean surface, near a ship, the device and the working tool are assembled. Said tool is connected to a cable 24. The device is then submerged, care having been taken to slip guides 7 and 26 onto the cables, preliminarily tensioned slightly. The bell descends by its own weight and guides 7, that direct it, engage structure 5. The device is then gently maneuvered, and pieces 12 and 14 engage the terminal portions of pipeline sections 1 and 2. Base plate 11 of the enclosure comes into contact with stationary plate 10, bolts 20 are engaged and hydraulic pressure is then applied, to turn the movable part of the said bolts, which has the effect of rigidly connecting the two plates. Once the pressure has been allowed to drop, the bolt remains in position and unites the device of the invention with the structure provided to receive it. The jaws of piece 27 are then actuated, to disengage this piece from the enclosure, leaving it in place. Piece 27 is then drawn up and the device is in its operative position. After cap 23a has been lowered to protect piece 23 during normal use, the divers actuate the cocks of panel 19a to effect necessary connections and control the various separating elements.

To remove the device of the invention, cap 23a is taken off, manipulating piece 27 is lowered again, capping piece 23. By hydraulic pressure the jaws are extended, engaging tool 27 on the enclosure. The hydraulic circuit is then continuous, and by pressure bolts 20 are loosened, with rotation thereof by a quarter or half turn as the case may be.

The device is then free, and by traction on cable 24 the enclosure and its associated elements can be raised.

Once out of the water, the assembly is recovered and inspected. Two similar devices that are absolutely interchangeable can be provided, allowing almost continuous maintenance of the installation.

The operation of the device of FIG. 2 is similar to that described above, with the exception that a tube 47, which is of great length, must engage the interior of the reservoir. In order to do this, an intermediate plate is provided that is supported by a ring 47a, rigidly connected with 47. The said plate is rigidly connected to guides 36 that slide along cables 52 and then along structure 32. This plate is intended to guide tube 47 and to introduce it accurately into a passage provided in plate 33. Intermediate plate 34 comes into contact with plate 33 and remains stationary, while the device continues to descend. At a certain moment plate 37 rests on the terminal portions of pipeline sections 29 and 30, and bolts 38 come into position, so that the enclosure may be rigidly connected by its base plate 37, intermediate plate 34 and plate 33 to the stationary structure. By means of hydraulic pressure, bolts 38 are turned so that they are engaged, fixing the device to the stationary structure. By the action of the jaws of piece 55 the said piece is disconnected from cap 50. Manipulating piece 55 can then be withdrawn as before. The disassembly of the device of the invention is accomplished as indicated for the device of FIG. 1.

In the same way, the actuating of various elements can be effected by the cocks of panel 43b, which is supplied with fluid by permanent lines.

In the device of the invention the connection of two pipeline sections is described, but it is obvious that any number of lines can be connected by this device.

I claim:

1. A connection assembly for connecting together a plurality of submerged pipes affixed to a supporting member which supports an upwardly directed orientation structure, said pipes being rigidly spaced by a first plate and having end portions extending slightly above said first plate, said first plate having a plurality of first fastener elements, said connection assembly comprising: a second plate downwardly facing said first plate, a plurality of receptacles carried by said second plate, said receptacles being adapted to fit over said pipe end portions and being fixed by said second plate at spaced locations corresponding to said pipe end portions for registry therewith, sealing means mounted inside of said receptacles for sealing engagement with said pipe ends, conduit means connecting said receptacles above said second plate means, valve means mounted in said conduit means, a plurality of second fastener elements carried by said second plate and being cooperative with said first fastener elements and adapted for remote actuation, a housing fixed to said second plate and enclosing said receptacle, conduit means, valve means, and second fastener elements, orientation members connected to said housing and slidable along said orientation structure, and cap means carried by said housing adapted for connection to a device for raising and lowering said connecting assembly.

2. A connection assembly according to claim 1 wherein said supporting member comprises a plate member spaced below said first plate, said plate member being connected to said pipes and supporting said orientation structure, said first fastener elements define a plurality of holes in said first plate, and said second fastener elements include bolting means, said receptacles have machine inner surfaces and said housing is generally cylindrical.

3. A connection assembly according to claim 1 in which said housing is filled with oil, said orientation structure comprises elongated members rigidly fixed on said supporting member and wires extending upwardly from said elongated members, and said orientation members comprise guides slidable along said wires and elongated members.

4. A connection assembly according to claim 1 further comprising a hydraulically controlled manipulating tool complementary with said cap means.

5. A connection assembly according to claim 1 wherein said bolting means are actuated by a rotary movement.

References Cited

UNITED STATES PATENTS

| 3,096,999 | 7/1963 | Ahlstone et al. | 166—.5 X |
| 3,363,683 | 1/1968 | Corley et al. | 166—.5 |
| 3,378,066 | 4/1968 | Otteman et al. | 166—.5 |
| 3,384,169 | 5/1968 | Leonard | 166—.5 |

FOREIGN PATENTS 956,191  4/1964  Great Britain.

JACOB SHAPIRO, Primary Examiner

U.S. Cl. X.R.

166—.5; 285—27